United States Patent

[11] 3,622,992

[72] Inventor Frank H. W. Schoenwitz
Arlington Heights, Ill.
[21] Appl. No. 866,459
[22] Filed Oct. 15, 1969
[45] Patented Nov. 23, 1971A
[73] Assignee Honeywell Inc.
Minneapolis, Minn.

[54] SUPERVISION AND CONTROL APPARATUS WITH SELECTIVE DISPLAY
8 Claims, 6 Drawing Figs.

[52] U.S. Cl. .......... 340/147 R, 340/151, 340/163, 340/225
[51] Int. Cl. .......... H04q 9/00
[50] Field of Search .......... 340/147, 152, 163, 151, 15, 324.1, 225, 408, 409; 178/6.8, 7.2

[56] References Cited

UNITED STATES PATENTS

| | | | |
|---|---|---|---|
| 3,292,489 | 12/1966 | Johnson et al. | 340/324.1 UX |
| 3,32,458 | 6/1967 | MacArthur | 340/152 UX |
| 3,350,687 | 10/1967 | Gabrielson et al. | 340/163 |
| 3,387,084 | 6/1968 | Hine et al. | 178/6.8 |
| 3,529,292 | 9/1970 | Neill et al. | 340/163 |

*Primary Examiner*—Donald J. Yusko
*Attorneys*—Lamont B. Koontz, Francis A. Sirr and Clyde C. Blinn

ABSTRACT: A system for remote temperature supervision and control of a large, complex multispace air-conditioning installation with a central station connected over a transmission circuit to a plurality of groups of remote stations for controlling apparatus in multispaces. A central console at the central station has supervision and control apparatus which can be selectively connected by coded messages over the transmission circuit to any one of the remote stations. The central console has a display means for selectively displaying a schematic showing of the apparatus of any one group of remote stations so that upon sending a coded message to a particular remote group, the particular remote group sends a coded message back to the central console to select a schematic showing of the particular group, whereby further supervision and control can be accomplished from the central console upon referring to the schematic.

INVENTOR:
FRANK H.W. SCHOENWITZ
BY Clyde C. Blinn
ATTORNEY.

SUPERVISION AND CONTROL APPARATUS WITH SELECTIVE DISPLAY

BACKGROUND AND SUMMARY OF THE INVENTION

In large and complex multispace air-conditioning installations, a central station or console is commonly used to control apparatus in the various spaces of the installation. When a human operator at a console in the central station selects a particular group of remote space apparatus, a display of the particular group of apparatus is provided at the console whereby the operator can selectively identify particular apparatus to be controlled and/or supervised from the console. Such a system is disclosed in the William B. Barnard, U.S. Pat. No. 3,058,663.

The present invention is concerned with a specific system for accomplishing the broad concept taught by the Barnard patent; in particular, in a system for supervising and controlling from a central station, a plurality of groups of remote apparatus are connected to a console over a transmission circuit making use of coded messages. The selection of the display at the console when a message is sent to one particular group of remote stations is accomplished by means of a display selection message sent from the remote group of stations to the console to selectively actuate a display means to a particular display whereby the operator at the console can then make the particular selection of a remote station in that group to be supervised and/or controlled.

Figure 1:
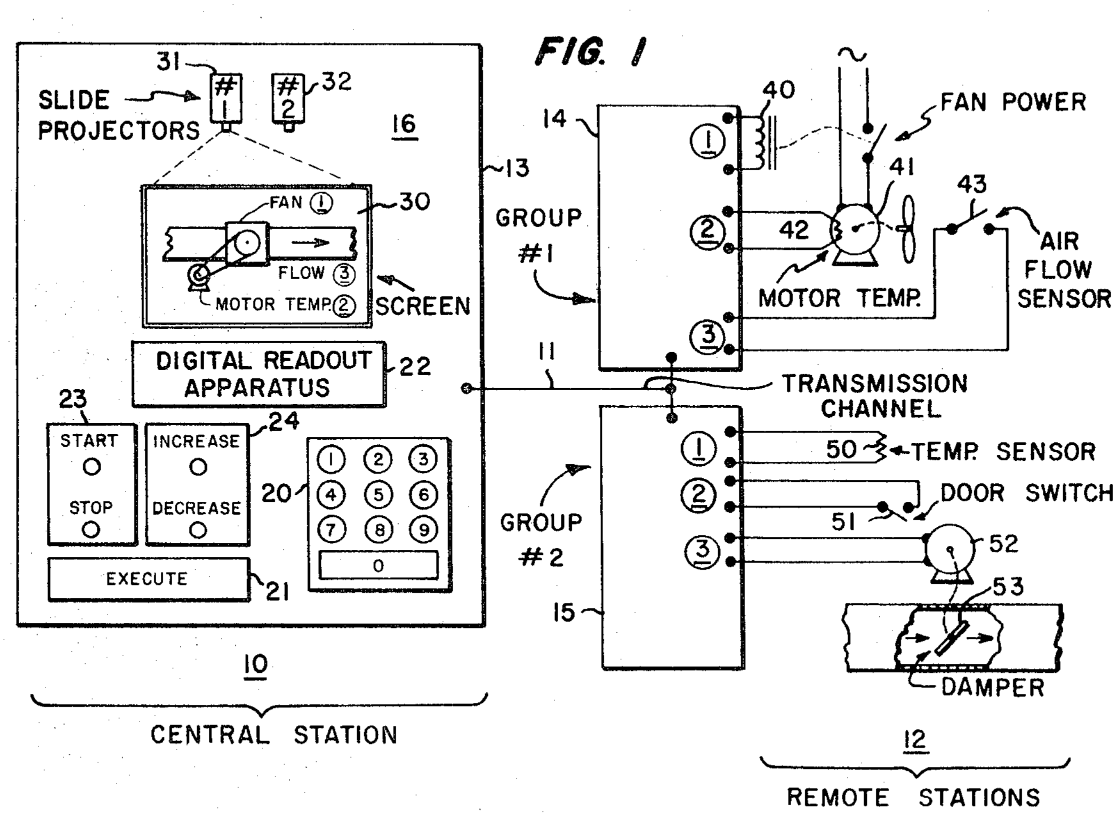

The invention is disclosed in a single sheet of drawing wherein:

FIG. 1 is a schematic representation of the system showing a central station and a plurality of groups of remote stations connected by a transmission circuit.

Figure 2:
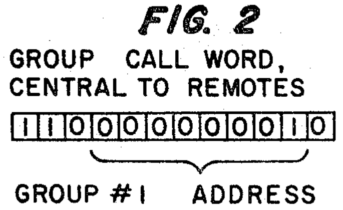
Figure 5:
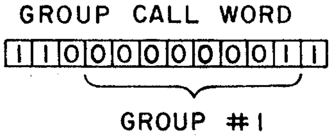
Figure 3:
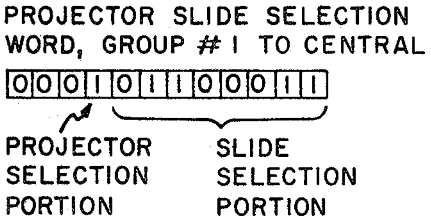
Figure 6:
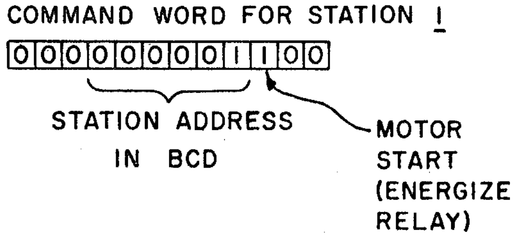
Figure 4:
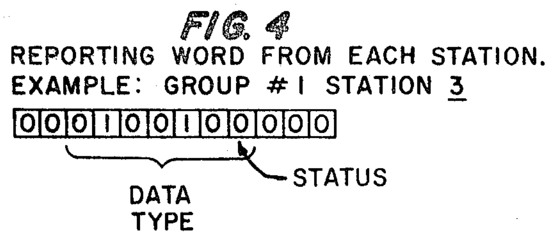

FIGS. 2 through 6 disclose a plurality of coded messages for providing the control and supervision and selection of the display at the console; in particular, FIG. 2 is a group call word, FIG. 3 is a projector slide selection word, FIG. 4 is a representative reporting word from each station, FIG. 5 is a group call word, and FIG. 6 is a command word.

DESCRIPTION OF THE INVENTION

Referring to FIG. 1, a schematic showing of a system having a central station 10 connected by a transmission channel 11 to a plurality of groups of remote stations 12. While only groups No. 1 and No. 2 are shown, many groups may be connected over one channel to the central station. The central station has a console 13 containing apparatus for sending messages over a transmission channel or circuit 11 to the plurality of group panels or apparatuses 14 and 15 associated with group No. 1 and group No. 2, respectively.

The console has a display means 16 for selectively displaying a diagrammatic or schematic showing of the specific apparatus or system of each group of remote stations. The selective operation of the display means is accomplished by the use of a coded message received from the group panel when a particular group is called by a coded message from the console. Specifically, the human operator at console obtains the showing of group No. 1 by calling any station at random in group No. 1 and group panel 14 sends back a display means selection message whereby the operator can study the diagrammatic showing to decide what particular operations at group No. 1 he wants to perform. The selection of the showing of group No. 1 at the display means in the console of the central station is determined by the display means selection message received from group No. 1 panel.

While the type of transmission used to and from console 13 and the remote group panels 14 and 15 to accomplish certain supervision and control functions is no part of the present invention, for explanation purposes one type is disclosed as shown in a James R. Berrett et al. U.S. Pat. application, Ser. No. 864,679, wherein the operation is accomplished by sending coded messages to and from the console 13 and group panels 14 and 15. Specifically, a keyboard 20 and associated apparatus in console 13 is used to make up the specific coded messages, comprising words made of 12 bits in a binary form, for calling a remote station and accomplishing certain commands when an execute button or switch 21 is actuated. From the console, apparatus can be supervised by means of a digital readout apparatus or indication means 22 and certain control commands can be accomplished by means of control or start-and-stop switches 23 and position control equipment increase-decrease apparatus 24.

Display means 16 may be a pair of random access slide projectors 31 and 32. As the number of slides, or storage means for pictoral showings, in a conventional random access projector is limited, more than one projector is used. Upon the operation of one of the projectors to select a particular slide, the apparatus of a particular group of remote stations is displayed on the screen 30 in a manner taught in the previous mentioned Barnard patent. A plurality of remote stations are disclosed in each of the groups No. 1 and No. 2. For example, group No. 1 has a relay 40 connected to station 1 for operating a switch to power a fan motor 41, station 2 has a temperature responsive element 42 for measuring the temperature of motor 41, and station 3 has a switch 43 which is connected to a conventional airflow sensor so that when the fan is operating, the switch is closed to indicate the presence of airflow. The remote stations associated with group No. 2 have a temperature responsive element 50 connected to station 1, a switch 51 connected to station 2 and a motor 52 connected to station 3. Motor 52 is connected to a damper 53 in an airflow duct so the position of the damper can be adjusted the motor 52 is energized. While certain types of remote stations are shown associated with both the groups No. 1 and No. 2, the apparatus details disclosed in FIG. 1 are only shown for explanation purposes as other types of apparatus could be supervised and/or controlled at each of the remote stations from the console.

In one particular type of transmission system used, a group call word or coded message can be sent from console 13 to the various groups of remote stations by a word such as shown in FIG. 2 wherein a group address can be made up of a coded message made up of eight bits in BCD form and the last bit is "0" to indicate a request to report or scan. Upon all of the groups receiving the group call word of FIG. 2, only group No. 1 is receptive to the particular word and apparatus in group panel 14 sends back a projector slide selection or display means word.

The projector slide selection word, as shown in FIG. 3, is made up of two portions, the projector selection portion and the slide selection portion. The console apparatus, upon receiving the mark or pulse in the fourth bit of the projector slide selection word, selects projector 31, and by means of the slide selection portion made up of eight bits (two four-bit BCD units), one of a number of slides is selected in projector 31 to display a schematic of the apparatus associated with group No. 1 on screen 30. Projector 32 is selected by no pulse in the fourth bit of the word of FIG. 3.

Subsequent to the selection of the slide by the projector selection word, a series of reporting words, such as shown in FIG. 4, are received by the console apparatus from panel 14 for each station of group No. 1. Since group No. 1 was addressed by the group call word of FIG. 2, console apparatus 14 receives the projector slide selection word followed by one reporting word of FIG. 4 from each of the three stations. Since only station 3 of group No. 1 was requested only the information of reporting word 3 is reported on the digital readout apparatus 22. The word of FIG. 4 has a data type or identification which includes a status which is shown by one bit to be "0" or no pulse or mark for the open, airflow, sensor switch 43 as shown in FIG. 1.

In order to supervise and/or control the apparatus associated with group No. 1, the human operator can then visually review the schematic of the apparatus of group No. 1 as shown on the screen 30 in FIG. 1. By means of another group call word having a last bit "1" to indicate a command and a following command word as shown in FIGS. 5 and 6, the operator can send a coded message from console 13 to panel 14 and station 1 to energize relay 40 and start fan motor 41. The station address is in binary code decimal (BCD) as shown in FIG. 6.

The apparatus of panels 14 and 15 for each of the groups contains circuit means such as a circuit board providing the projector slide selection word as shown in FIG. 3 for each of the groups. When the group stations are changed to supervise and control other types of apparatus, the display provided at the console can be modified by changing the slide selection word or message from the group by modifying the circuit board. Such a modification at the group panel reduces the complexity of the central station and reduces the size of the console.

OPERATION OF THE INVENTION

For the particular apparatus shown associated with group No. 1, a typical operation of the display means at console 13 by the human operator is accomplished in the following manner. Assuming that the operator wants to perform some operation at one of the remote stations in group No. 1, the operator sends a group call word to group No. 1 selecting any one of the stations of the group at random as he may know the group but not the correct station address for a particular remote station. Upon sending the group call word which is shown in FIG. 2, group panel 14 first returns with a coded message or the projector slide selection word as shown in FIG. 3 to operate the desired projector and display a particular slide to provide a showing or a schematic of the apparatus or system associated with group No. 1 on screen 30. With the schematic on screen 30 as in FIG. 1, the human operator is able to view the apparatus or system and observe that the fan motor is at station 1.

After visually reviewing the schematic display on screen 30, the human operator can start fan motor 41 which is identified in the schematic as station 1 by sending another group call word or coded message for group No. 1, station 1, as shown in FIG. 5, which would be followed by a command word, as shown in FIG. 6, to cause energization of the relay 40 at station 1 and start the operation of fan motor 41.

The embodiments of the invention in which an exclusive property or right is claimed are defined as follows:

1. A system for remote supervision and control of a multistation installation wherein a central station is connected over a transmission channel to a plurality of groups of remote stations having apparatus to be supervised and controlled and coded messages are used to and from the central and groups of stations comprising:

a console at said central station comprising supervision and control apparatus and display means for selectively displaying a showing of the apparatus associated with the remote stations of said plurality of groups, means associated with said console for sending over said channel a coded message to a particular group of stations, and means associated with said particular group of stations upon receiving said coded message for returning a second coded message to said console for selectively actuating said display means for displaying a showing of the apparatus associated with the remote stations in said particular group.

2. The invention of claim 1 wherein said display means comprises a random access slide projector for selectively placing a schematic on a screen.

3. The invention of claim 1 wherein:

said display means comprises a plurality of random access projectors each having a plurality of slides for selectively placing a schematic on a screen and;

said second coded message having a first portion for designating which of said plurality of projectors is energized and a second portion for designating which slide is used.

4. The invention of claim 1 wherein said schematic of the apparatus can be viewed on said display means by a human operator to select particular apparatus to be supervised and controlled whereby a subsequent coded message can be sent from said console to said particular apparatus.

5. The invention of claim 1 wherein the installation is an air-conditioning installation and the plurality of groups are located in different physical areas of the installation and said apparatus associated with said remote stations is air-conditioning apparatus comprising:

means associated with said console for reading and controlling temperature whereby upon reviewing said showing further coded messages can be sent to said particular group to measure and control temperature at selected remote stations and still further coded messages can be sent back to said console.

6. The invention of claim 1 wherein said display means comprises a first and second component and, said second coded message comprises a first portion for selecting one of said components to be used and a second portion for selecting the particular showing to be displayed.

7. The invention of claim 1 wherein the groups of remote stations each have a panel comprising an electrical circuit, said circuit being adapted to be changed to preselect the particular second coded message whereby a schematic showing can be indicative of the apparatus associated with the group selected.

8. The invention of claim 1 wherein said display means comprises a storage means for storing a plurality of showings, said storage being selectively energized by said second coded message.

* * * * *